(12) United States Patent
McCowin

(10) Patent No.: US 8,714,067 B2
(45) Date of Patent: May 6, 2014

(54) MECHANISM AND METHOD FOR PREDETERMINED ANGULAR CUTTING OF A PLURALITY OF PLY STRIPS

(71) Applicant: The Boeing Company, Chicago, IL (US)

(72) Inventor: Peter D. McCowin, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 13/661,560

(22) Filed: Oct. 26, 2012

(65) Prior Publication Data

US 2013/0047810 A1   Feb. 28, 2013

Related U.S. Application Data

(62) Division of application No. 11/750,154, filed on May 17, 2007, now Pat. No. 8,327,743.

(51) Int. Cl.
*B26D 1/00* (2006.01)

(52) U.S. Cl.
USPC .............. 83/215; 83/350; 83/356.3; 83/356.2

(58) Field of Classification Search
USPC .................. 83/34, 356.3, 913, 549, 566, 618, 83/699.11, 350, 356.2, 215
See application file for complete search history.

(56) References Cited

U.S. PATENT DOCUMENTS

| | | | |
|---|---|---|---|
| 3,329,181 A | 7/1967 | Buss et al. |
| 4,491,493 A | 1/1985 | Eaton |
| 4,531,992 A | 7/1985 | Eaton |
| 4,699,683 A | 10/1987 | McCowin |
| 5,110,395 A | 5/1992 | Vaniglia |
| 5,197,198 A | 3/1993 | Onozato |
| 6,675,688 B2 | 1/2004 | Ostini |
| 6,748,836 B2 | 6/2004 | Vivirito et al. |
| 6,767,426 B1 | 7/2004 | Yamamoto |
| 7,137,182 B2 | 11/2006 | Nelson |
| 2006/0162143 A1 | 7/2006 | Nelson |
| 2007/0039434 A1 | 2/2007 | De Vlieg et al. |

*Primary Examiner* — Omar Flores Sanchez
(74) *Attorney, Agent, or Firm* — Klintworth & Rozenblat IP LLC

(57) ABSTRACT

Apparatus for cutting plural aligned ply strips includes plural knife blades disposed in a spaced manner such that each knife blade is aligned with and in closely spaced relation to an associated ply strip. The knife blades are pivotally mounted in a common housing and are coupled to a single rotational drive for allowing each knife blade to assume the same predetermined cutting angle relative to its associated ply strip, where the cutting angle may be varied between ±45°. The plural knife blades are coupled to a rotational drive by means of plural circular drive gears and are connected to a linear drive for displacing the knife blades into contact with the ply strips for cutting the strips at the predetermined angle. The severed edges of the aligned ply strips are formed in mutual linear alignment and do not include projecting triangular patterns, or crenelations.

25 Claims, 5 Drawing Sheets

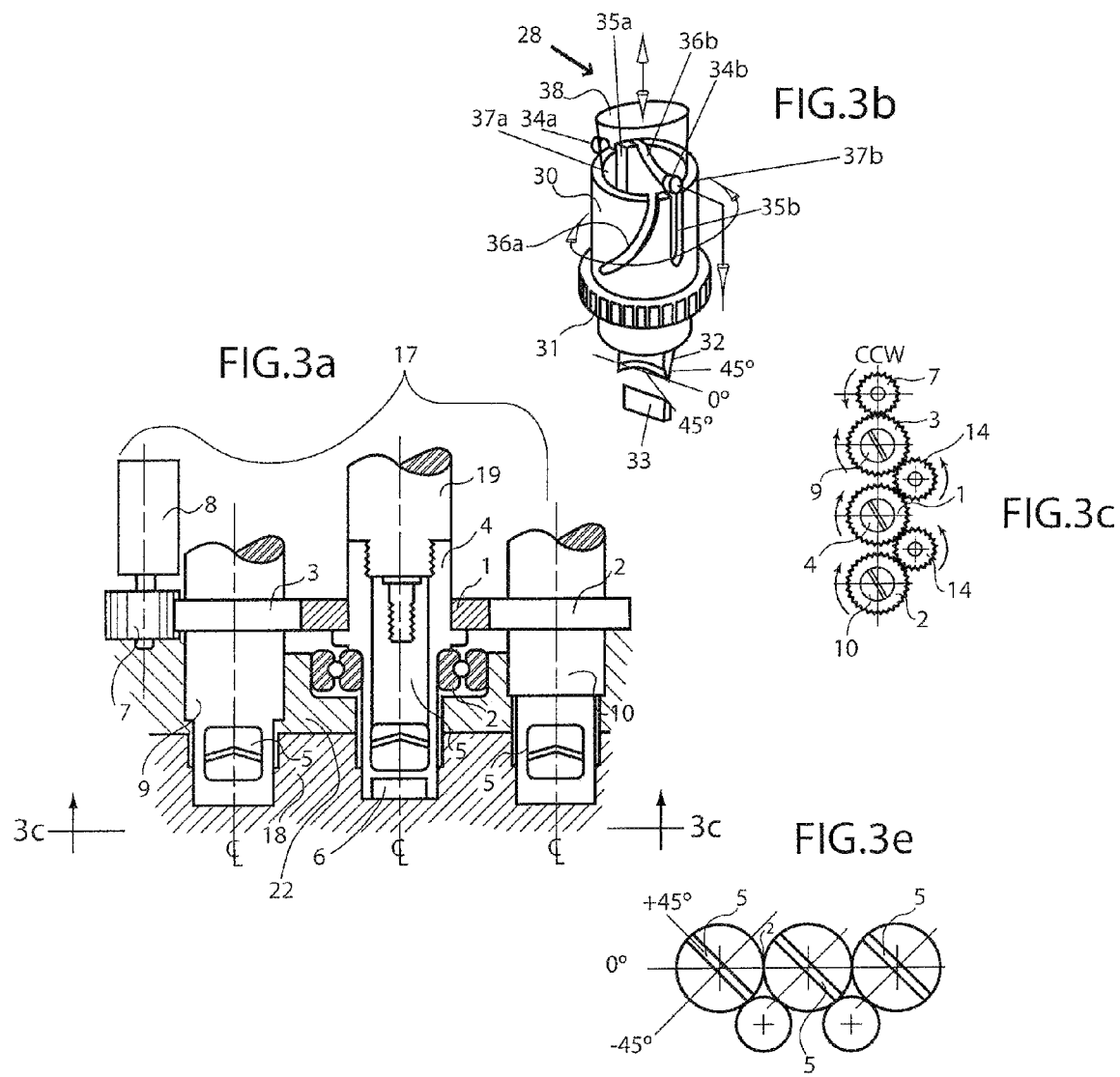

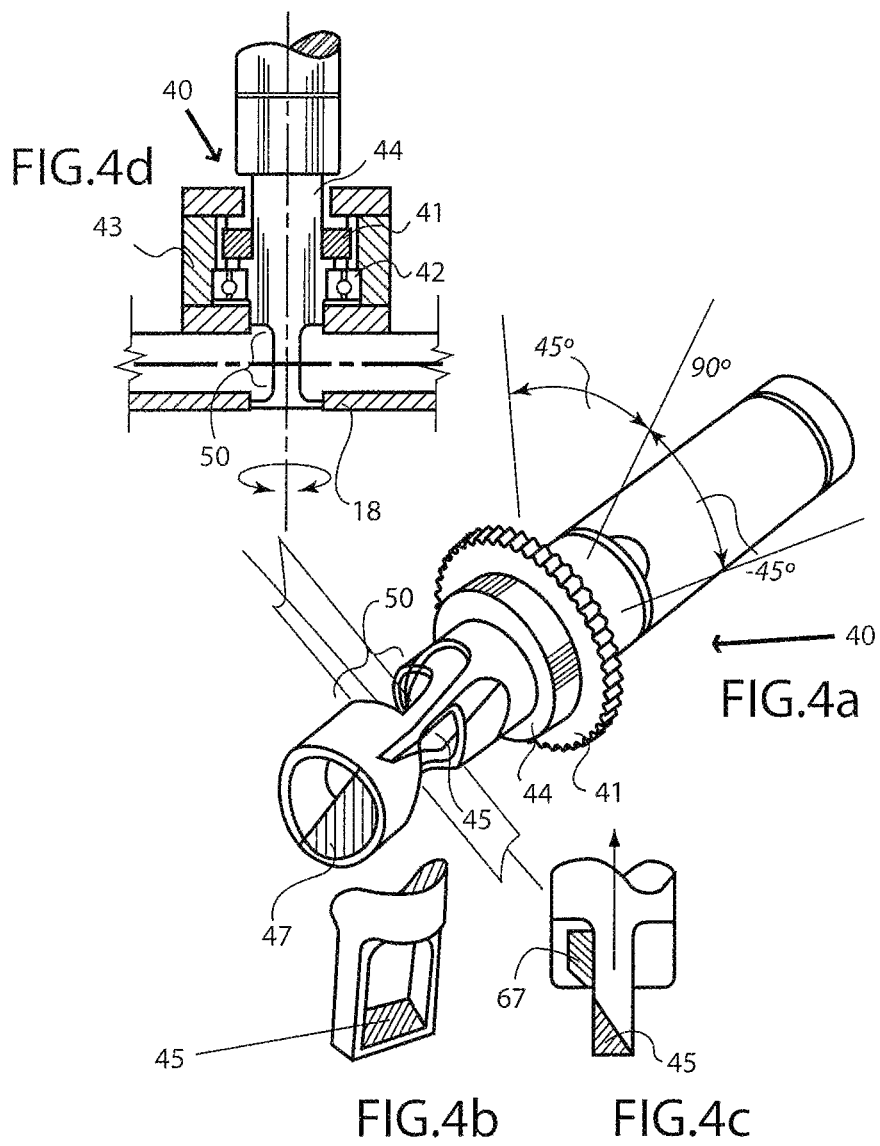

MECHANISM AND METHOD FOR PREDETERMINED ANGULAR CUTTING OF A PLURALITY OF PLY STRIPS

CROSS-REFERENCE TO RELATED APPLICATIONS

This application claims priority to and is a divisional of U.S. patent application Ser. No. 11/750,154, entitled Mechanism And Method For Predetermined Angular Cutting Of A Plurality Of Ply Strips filed May 17, 2007, which is hereby incorporated by reference in its entirety.

TECHNICAL FIELD

This disclosure relates generally to improvements in the automated manufacture of composite structural assemblies and is more particularly directed to a mechanism and method for the cutting of plural, spaced, aligned ply strips at a predetermined cutting angle for forming a composite ply assembly having a substantially straight edge without tape triangular patterns or crenelations.

BACKGROUND

Increasingly, in an effort to reduce aircraft weight, designers are turning to the use of composite ply assemblies for the manufacture of structural and skin assemblies. Composite application systems and methods incorporating this fiber placement approach have been developed as described in U.S. Pat. No. 4,699,683. This type of composite line assembly structure and method involves the alignment of plural strips in contiguous edge contact so as to form a single wide band of composite ply strips. The ply strips can vary in width depending on the contour or tracking capability required for the specific structural application. A typical band is formed of 12 individual ¼ inch wide ply, or tape, strips for a total output bandwidth of 3 inches. Thus, a plurality of 3 inch bands would be placed in contiguous edge contact at predetermined orientation until the structure tooling mold is coated. A further embodiment of this type of fiber placement apparatus provides the capability to add, drop off or cut any or all of the contiguous strips allowing tailored flexibility in the configuration and orientation of the individual ply strips in the manufactured ply assembly.

Fiber lamentation cutting methods have suffered from a lack of operational capability to alter the orientation of the shear cut angle of each constituent tape from a fixed perpendicular cut as referenced to the centerline direction of the applied ply strip. As a result, ply cuts, or drop offs, occurring during predetermined path applications of +/−45° produce triangular patterns known as crenelations. The resolution of the resulting step triangulation is related both to the composite tape strip width and the applied orientation, or angle. Each constituent ply strip within the total bandwidth of strips incorporates this triangular pattern, or crenelation, with each cut. As a result, at the completion of the tape cutting sequence, the thus-produced edge of the composite ply assembly includes a triangular pattern.

Engineered composite assemblies typically include numerous ply laminations each formed by means of an orientation tailored segmented tape cutting process. The very large number of accumulated small tape triangular patterns or crenelations, formed in the built-up laminated ply assembly result in additional structural weight without the benefits of increased structural integrity and mechanical strength.

The embodiments of the disclosure are intended to overcome the limitations of the prior art by providing improved apparatus and method for the automated manufacture of composite structural assemblies which include precisely defined, linear edges formed at virtually any angle relative to the longitudinal axes of the connected ply strips and which do not include triangular patterns, or crenelations.

SUMMARY

Accordingly, embodiments of the disclosure provide an improved apparatus and method for cutting plural aligned, spaced ply strips at virtually any angle relative to their longitudinal axes so as to provide a linear array of aligned, substantially straight cut edges of the ply strips which are free of triangular patterns or crenelations.

Embodiments of the disclosure sequentially cut plural flat ply strips disposed in spaced relation in forming a planar array of ply strips where the ply strips are displaced in parallel along their lengths, and where the ply strips may all be cut at virtually any predetermined angle and the severed edges of each of the ply strips form a substantially straight edge with no triangular patterns and all of the severed edges are in linear alignment.

Embodiments of the disclosure may also form a composite structural assembly comprised of plural spaced ply strips arranged in a planar array where the ends of the ply strips (1) may be formed at virtually any single angle relative to the strip longitudinal axis, and (2) define plural substantially straight edges with no crenelations extending therefrom and which are linearly aligned.

Embodiments of the disclosure also provide an improved mechanism and method for forming the cut edges of plural spaced ply strips forming a composite structural assembly in a substantially straight line, where the aligned edges are formed at virtually any angle relative to the longitudinal axes of the ply strips, and where the severed edges may be formed by a cutting action initially directed through the ply strips or initially directed through an underlayment of the ply strips.

Embodiments of the disclosure may include apparatus for predetermined angular cutting of a plurality of parallel, spaced ply strips, the apparatus comprising a housing; a plurality of cutting assemblies pivotally disposed in the housing and aligned in a side-by-side, planar array, wherein each cutting assembly is aligned with a respective ply strip; a first displacement arrangement for pivotally displacing the cutting assemblies in said housing so that each cutting assembly is oriented at a common predetermined angle relative to an associated ply strip; and a second displacement arrangement for linearly displacing the cutting assemblies into contact with and severing an associated ply strip with which each cutting element is aligned in forming plural cut end portions in the ply strips, wherein the cut end portions of the ply strips are in linear alignment and do not include triangular patterns or crenelations.

BRIEF DESCRIPTION OF THE DRAWINGS

The appended claims set forth those features which characterize embodiments of the disclosure. However, the embodiments of the disclosure, as well as further aspects and advantages thereof, will best be understood by reference to the following detailed description of a preferred embodiment taken in conjunction with the accompanying drawings, where like reference characters identified like elements throughout the figures, in which:

FIG. 3a is a planar view, shown partially in section, of a plural knife cutting arrangement with a rotational drive for changing the cutting angle of the knife edges in accordance with one embodiment of the present disclosure;

FIG. 3b is a perspective view, shown partially in phantom, of another embodiment of an adjustable angle knife edge cutting arrangement in accordance with another embodiment of the present disclosure;

FIG. 3c is a bottom plan view of the knife edge cutting arrangement with adjustable angular positioning shown in FIG. 3a;

FIG. 3e is simplified plan view of the plural knife cutting edges shown in FIG. 3a illustrating the angular range of motion of the cutter/shear mechanism of the present disclosure;

FIG. 4a is a perspective view of another embodiment of a single cutter/shear assembly in accordance with the principles of the present disclosure;

FIG. 4b is a partial perspective view of the cutting knife used in the single cutter/shear assembly of FIG. 4a;

FIG. 4c is a simplified sectional view of the knife cutting edge shown in FIG. 4b in combination with a fixed reaction knife blade;

FIG. 4d is a simplified sectional view showing the single cutter/shear assembly of FIG. 4a rotationally mounted in a support housing including plural rotary drive gears.

DETAILED DESCRIPTION

Figure 1:
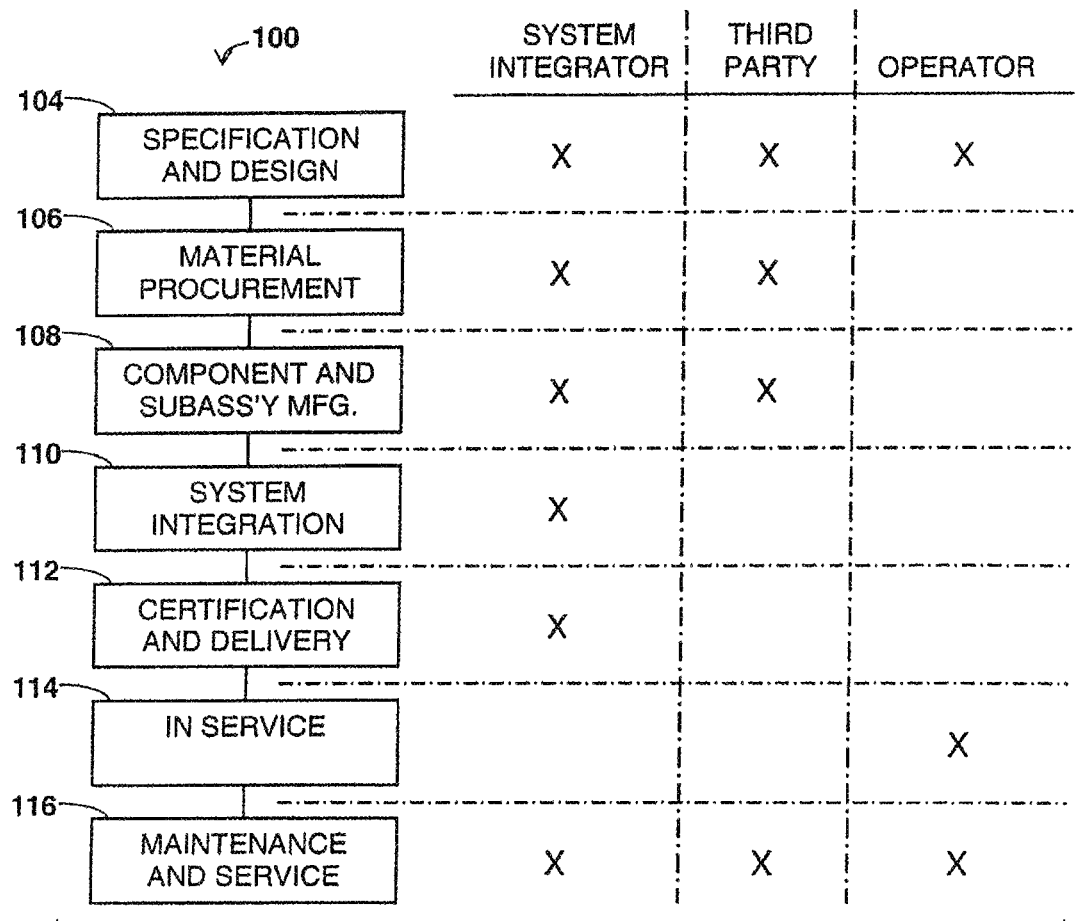
FIG. 1 is a flow diagram of aircraft production and service method.
Figure 2:
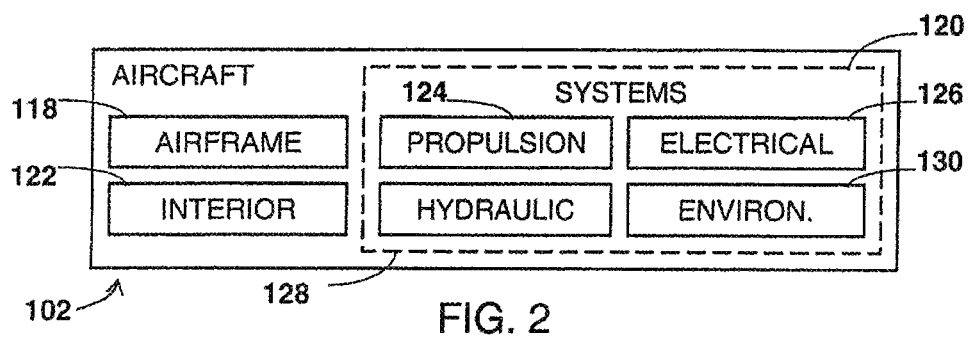
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may include modification, reconfiguration, refurbishment, and so on).

Each of the processes of method 100 may be performed or carried out by a system integrator, a third party, and/or an operator (e.g., a customer), as indicated by the "X" in the grid to the right of the flow diagram of FIG. 1. For purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Referring to FIG. 3a, there is shown a simplified plan view, shown partially in section, of a variable angle cutting element 17 in accordance with one embodiment of the present disclosure. FIG. 3c is a bottom plan view of a portion of the variable angle cutting element 17 shown in FIG. 3a illustrating details of a preferred rotation pivot drive arrangement including a pair of reversing idler gears 14 used to maintain knife cutting edge orientation. FIG. 3e is a plan view of the three shear knife blade assemblies 5 showing their range of rotational motion for severing plural ply strips at a predetermined angle.

Variable angle cutting element 17 includes plural cutter assemblies 4, one for each of three shear knife blade assemblies 5. Variable angle cutting element 17 provides close non-rotational linear alignment of each knife blade 5 with an associated fixed reaction knife blade 6. Each cutter mechanism housing 4 is typically press fit, concentric within the inner bore diameter of a circular bearing 21. The outer diameter of bearing 21 is, in turn, press-fit mounted within a fixed cutter alignment structure 22. A spindle drive gear 7 is concentrically pressed onto a suitable machined step of the variable angle cutting element 17. Angular positioning of each of the cutter assemblies 4 is achieved by predetermined, or selected, rotation of a micro servo drive motor 8 transmitted through spindle drive gears 1, 2 and 3, as well as the pair of orientation idler gears 14 as shown in FIG. 3c. Drive motor 8 is coupled to spindle drive gear 3 by means of drive gear 7. Drive motor 8 provides sufficient torque capacity and rotational positioning accuracy for rotationally displacing and positioning the three shear knife blade assemblies 5. In addition, idler gears 14 may be in the form of a commercial gear which is split along its centerline with an internal spring system which loads each side of the contact gear teeth for eliminating gear system backlash. Ply strip cutting occurs when three knife blade plungers, or actuators, 19 each connected to an associated cutter assembly 4, displace the three shear knife blade assemblies 5 downward as viewed in FIG. 3a. Downward displacement of the knife blade assemblies 5 causes each knife blade assembly to engage a respective ply strip. When a knife blade assembly 5 passes beyond an associated fixed reaction knife blade 6, as shown for the center shear knife blade assembly in FIG. 3a, the ply strip is severed.

As shown in FIG. 3c, drive gear 7 rotating counterclockwise directly drives spindle drive gear 3 clockwise so as to orient cutter assembly 9 coupled thereto at a predetermined angle of rotation. One of the idler gears 14 engages spindle drive gears 1 and 3 so as to rotate drive gear 1 at the same speed and in the same direction as drive gear 3. Similarly, the second idler gear 14 engages spindle drive gears 1 and 2. Both of these spindle gears rotate in the same direction at the same speed as also shown in FIG. 3c. This pattern of alternating drive gears and idler gears may be repeated so as to rotationally drive additional cutter assemblies which are not shown in FIG. 3c for simplicity. Therefore, controlled rotational positioning by drive motor 8 of drive gear 7 is repeated through the entire bank of cutter elements so that each cutting blade of each cutter assembly assumes substantially the same angular orientation for engaging a respective ply strip at the same angle of incidence. This is shown in the simplified plan view of FIG. 3e, wherein each of the three shear knife blade assemblies 5 is shown having substantially the same angular orientation relative to a 0° reference line drawn through the center of each of the three shear knife blade assemblies. FIG. 3e also shows that the range of rotational motion of each of the shear knife blade assemblies 5 achievable by the mechanism and method of this disclosure is ±45°, where each of the shear knife blade assemblies may be rotationally displaced either clockwise or counterclockwise.

Figure 3F:
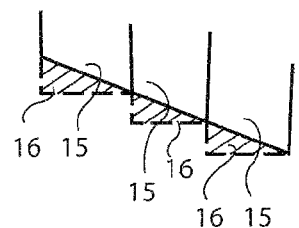
FIG. 3f is a simplified plan view of a typical crenelated pattern formed in the aligned cut patterns encountered in prior art plural ply strip cutting arrangements.
Figure 3D:
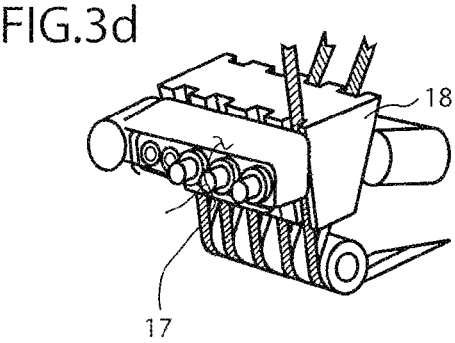
FIG. 3d is a perspective view of a portion of the knife cutting arrangement of FIG. 3a shown in position adjacent a ply strip alignment housing which displaces plural ply strips along their respective lengths for sequential cutting by plural aligned knife edges.
Figure 3G:
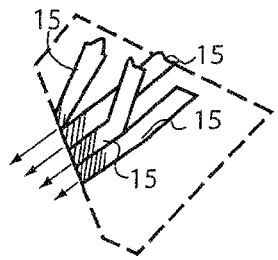
FIG. 3g is a simplified perspective view of plural aligned severed ply strips having linearly aligned, substantially straight edges cut in accordance with the present disclosure.

The combined predetermined ply strip cutting and controlled rotational orientation of the shear knife blade assemblies 5 relative to the plural ply strips output bandwidth eliminates the scrap crenelated segments 16 shown in FIG. 3f in dotted line form disposed on the ends of three parallel inline ply strips 15 as encountered in the prior art. Each of the ply strips 15 is displaced in the direction of the arrows shown in FIG. 3f by means of a ply alignment housing 18 shown in FIG. 3d. Also shown in FIG. 3d is a portion of the variable angle cutting element 17 described above and shown in FIG. 3a. Each of the shear knife blade assemblies 5 is aligned with and closely spaced from an associated ply strip for engaging and severing the ply strip in a timed sequence. More specifically, each ply strip is typically aligned centrally along a respective centerline of its associated shear knife blade assembly 5 and all ply strips are spaced in an equidistant manner from their associated shear knife blade assembly. This timed sequence is under the control of a timer mechanism (not shown for simplicity) connected to, or incorporated in, each of the knife plunger actuators 19 for sequentially displacing each knife blade assembly 5 into contact with a respective ply strip for severing the strip. Each of the actuators 19 displaces an associated shear knife blade assembly 5 toward and into engagement with a respective ply strip 15 for sequentially severing the ply strips so as to form a substantially straight line, or linear array, of smooth cut edges of the ply strips as shown in FIG. 3g. The cut edges of the ply strips 15 cut in accordance with the present disclosure shown in FIG. 3g do not incorporate crenelations as in the prior art.

The manner in which the ply strips are sequentially cut may be accomplished by any number of well-known ply strip drive mechanisms and timed cutting arrangements. The timed sequence of the cutting of the individual ply strips is a function of the angle at which the individual ply strips are severed as is well known. In addition, the individual knife blades are shown as having a chevron-shaped cutting edge so as not to force the ply strip to one side or the other of the alignment guides shown in the ply alignment housing 18. The individual knife blades may also be provided with a single shallow raked angle blade.

Referring to FIG. 3b, there is shown a shear knife blade assembly 28 in accordance with another embodiment of the disclosure. A knife blade 32 is disposed on an end of a cylindrical housing 30. Also disposed on the cylindrical housing 30 about its outer circumference is a spindle drive gear 31 which allows for the rotational displacement of the housing and knife blade for engaging a ply strip at a predetermined angle. Also shown in FIG. 3b is a reaction knife blade 33 which cooperates with knife blade 32 in forming a sharp edge on a severed ply strip (not shown in the figure for simplicity).

Cylindrical housing 30 is hollow and has disposed therein a connected cylindrical-shaped knife plunger actuator 38 for linearly displacing the cylindrical housing 30 and the knife blade 32 attached thereto as previously described in terms of the embodiment shown in FIG. 3a. Disposed on opposed outer lateral portions of knife plunger actuator 38 are first and second pins 34a and 34b. Disposed within cylindrical housing 30 are three pairs of slots 35a and 35b, 36a and 36b, and 37a and 37b for establishing the angle at which the knife blade 32 engages a ply strip. Each of the slots extends downward from the upper edge of the cylindrical housing 30, and each pair of slots is adapted to receive one of the first and second pins 34a and 34b. Thus, a first pair of linear slots 35a and 35b are disposed on opposed portions of the cylindrical housing 30. With the first and second pins 34a and 34b respectively disposed in linear slots 35a and 35b, the knife blade 32 may engage a ply strip at an angle of 90° relative to the longitudinal axis of the ply strip. A first pair of curvilinear slots 36a and 36b extend downwardly in a first direction about the cylindrical housing 30. With first and second pins 34a and 34b respectively disposed in curvilinear slots 36a and 36b, knife blade 32 will engage a ply strip at a +45° angle relative to the longitudinal axis of the ply strip. A second set of curvilinear slots 37a and 37b is also disposed within the cylindrical housing 30 and extend downwardly from the top of the cylindrical housing in a second, opposed direction about the cylindrical housing. Thus, the second set of curvilinear slots 37a, 37b extend in a direction about the cylindrical housing 30 opposite to the direction of the first set of curvilinear slots 36a, 36b. With the first and second pins 34a, 34b respectively disposed in curvilinear slots 37a, 37b, knife blade 32 engages a ply strip at an angle of −45° relative to the longitudinal axis of the ply strip. When the knife plunger actuator 38 is linearly displaced downwardly as viewed in FIG. 3b, the first and second pins 34a, 34b each trace a helical path within an associated pair of curvilinear slots (36a and 36b or 37a and 37b) resulting in rotational displacement of the cylindrical housing 30 and knife blade 32 attached thereto for cutting a ply strip at an angle of either +45° or −45°.

Referring to FIG. 4a, there is shown a perspective view of a single cutter mechanism 40 in accordance with yet another embodiment of the disclosure. The single cutter mechanism 40 includes a cylindrical spindle housing 44 having an orientation gear 41 concentrically disposed about its outer circumference. Spindle housing 44 further includes a cutter feed-through slot 50 to provide clearance for a ply strip (not shown for simplicity) as needed for a shear knife 45 disposed in the spindle housing 44 which cooperates with a fixed reaction knife blade 47 in severing a ply strip inserted through the cutter feed-through slot 50. As in the previously described embodiments, cutter mechanism 40 is maintained in position by means of a circular bearing 42 so as to be freely rotatable in a variable angle cutting element by means of an outer gear 43 engaging orientation gear 41.

A further embodiment of the shear knife 45 is shown in FIG. 4b. In this embodiment, the knife blade 45 does not undergo a rapid downward motion in severing a ply strip, but rather is quickly moved upward in severing the ply strip to reduce, or minimize, epoxy resin induced tack sticking of the tape to either the guide shoot walls or cutting device edge as shown in FIG. 3d. In FIG. 4c, a fixed reaction knife blade 67 is shown in cooperation with the shear knife 45 for severing a ply strip. In this embodiment, the shear knife 45 is positioned such that the cutter feed through slot 50 is centered within a suitably sized aperture within the ply alignment housing 18 shown in FIG. 3*d*.

Figure 5:
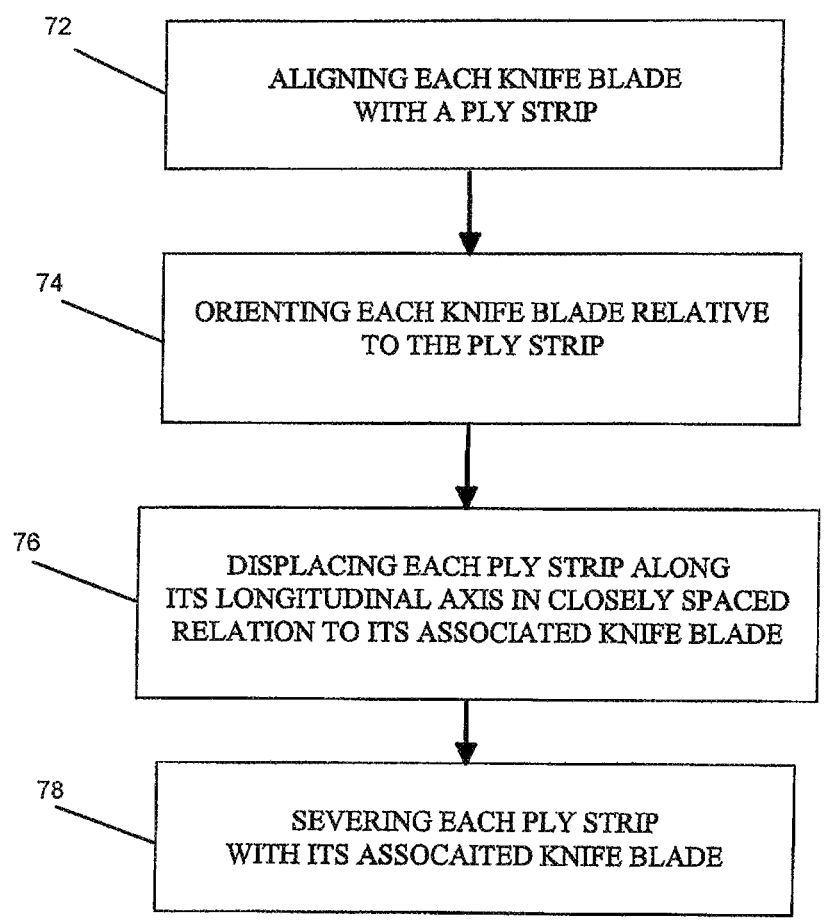
FIG. 5 is a simplified flow chart showing the series of steps carried out in accordance with one embodiment of the present disclosure.

FIG. 5 is a flow chart illustrating the sequential series of steps 72, 74, 76 and 78 carried out in accordance with one embodiment of the method for predetermined angular cutting of a plurality of ply strips of the present disclosure. A brief description of the operation carried out in each step is provided in each block of the flow chart.

While particular embodiments of the disclosure have been shown and described, it will be obvious to those skilled in the relevant arts that changes and modifications may be made without departing from the embodiment in its broader aspects. Thus, any such variations are within the scope and spirit of the broad concept and implementation of the embodiments of the disclosure described herein. Therefore, the aim in the appended claims is to cover all such changes and modifications as fall within the true spirit and scope of the disclosure. The matter set forth in the foregoing description and accompanying drawings is offered by way of illustration only and not as a limitation. The actual scope of the embodiments is intended to be defined in the following claims when viewed in their proper perspective based on the prior art.

I claim:

1. An apparatus for angular cutting of a plurality of parallel, spaced ply strips, said apparatus comprising;
    a housing:
    a plurality of cutting assemblies pivotally disposed in said housing, wherein each cutting assembly is aligned with a respective ply strip;
    a first displacement mechanism for pivotally displacing said cutting assemblies in said housing so that each cutting assembly is oriented at a common predetermined angle relative to its respective ply strip; and
    a second displacement mechanism for linearly displacing said cutting assemblies into contact with and severing, in a timed sequence, their respective ply strips with which each cutting assembly is aligned to form plural, linearly aligned, cut, end portions in the ply strips.

2. The apparatus of claim 1 wherein the second displacement mechanism is configured to linearly displace said cutting assemblies in the timed sequence to form the plural, linearly aligned, cut, end portions in the ply strips which are linearly aligned at the common predetermined angle with no triangular patterns or crenelations.

3. The apparatus of claim 2 wherein the common predetermined angle is non-perpendicular to longitudinal axes of the parallel, spaced ply strips.

4. The apparatus of claim 1 wherein said plurality of cutting assemblies are aligned in a side-by-side, planar array.

5. The apparatus of claim 1 wherein each of said cutting assemblies includes a respective knife blade coupled to a respective cylindrical member having a first gear disposed about the outer circumference thereof.

6. The apparatus of claim 1 wherein said first displacement mechanism comprises a driver motor coupled to a plurality of gears for rotating each cutting assembly to the common predetermined angle.

7. The apparatus of claim 6 wherein the plurality of gears comprises a drive gear attached to the driver motor, a plurality of spindle drive gears attached to the cutting assemblies and driven by the drive gear, and a plurality of idler gears coupled to and between the spindle drive gears.

8. The apparatus of claim 7 wherein the plurality of spindle drive gears rotate in an opposite direction as the plurality of idler gears.

9. The apparatus of claim 1 further comprising plural bearings each supporting a respective cutting assembly in said housing.

10. The apparatus of claim 1 further comprising a third displacement mechanism engaging the ply strips for displacing the ply strips in a linear manner along their respective lengths adjacent to said cutting assemblies to facilitate cutting of each ply strip by a respective cutting assembly.

11. The apparatus of claim 10 further comprising a timing mechanism coupled to said cutting assemblies for sequentially actuating each of said cutting assemblies in the timed sequence to form the plural, linearly aligned, cut, end portions in the ply strips.

12. The apparatus of claim 1 wherein said predetermined angle is within the range of +45° and −45° relative to a longitudinal axis of the ply strips.

13. The apparatus of claim 1 wherein each of said cutting assemblies includes a knife blade having a chevron-shaped cutting edge.

14. The apparatus of claim 1 wherein each of said cutting assemblies includes a knife blade having a single shallow raked angle blade.

15. The apparatus of claim 1 wherein each of said cutting assemblies includes a knife blade and further comprising plural fixed reaction knife blades each disposed adjacent an associated cutting assembly knife blade to facilitate cutting of the ply strips.

16. The apparatus of claim 1 further comprising a ply alignment mechanism having plural spaced linear slots each adapted to engage a respective ply strip for maintaining the ply strips in parallel, fixed alignment when cut.

17. The apparatus of claim 1 wherein the second displacement mechanism includes actuators for linearly displacing said cutting assemblies.

18. The apparatus of claim 1 wherein each of said cutting assemblies includes a knife blade and a slot in a member, wherein each associated ply strip is disposed in said slot and is cut by said second displacement mechanism displacing the associated knife blade within the member.

19. The apparatus of claim 18 further comprising plural fixed reaction knife blades, each disposed adjacent a respective ply strip in between the ply strip and the member of an associated cutting assembly.

20. The apparatus of claim 1 wherein the plurality of parallel, spaced ply strips form a composite aircraft component.

21. An arrangement for cutting plural flat ply strips at a predetermined angle during composite aircraft fabrication, said arrangement comprising:
    a first housing adapted for receiving the flat ply strips and maintaining the ply strips in a side-by-side, aligned planar array;
    a second housing including plural substantially straight edge cutting assemblies arranged in a spaced manner, wherein the spacing between adjacent cutting assemblies is the same as the spacing between adjacent ply strips permitting each cutting assembly to be aligned with an associated ply strip, and wherein each cutting assembly is adapted for rotational displacement in said second housing about an axis;
    a first rotational drive coupled to each of said cutting assemblies for positioning each cutting assembly at a selected angle relative to the ply strip with which the cutting assembly is aligned; and
    a second linear drive coupled to each of said cutting assemblies for displacing each cutting assembly into engagement with and cutting its associated ply strip at said selected angle in a timed sequence to form plural, linearly aligned, cut, end portions in the ply strips.

22. The apparatus of claim 21 further comprising a timing mechanism which displaces said cutting assemblies in the timed sequence to form the plural, linearly aligned, cut, end portions in the ply strips which do not include triangular patterns or crenelations.

23. The apparatus of claim 21 wherein the predetermined angle is non-perpendicular to longitudinal axes of the ply strips.

24. An apparatus for angular cutting of a plurality of parallel, spaced ply strips, said apparatus comprising:
   a plurality of cutting assemblies;
   a first displacement mechanism for rotating said cutting assemblies so that each cutting assembly is oriented at a common predetermined angle; and
   a second displacement mechanism for linearly displacing said cutting assemblies into contact with and to sever, in a timed sequence, respective ply strips with which each cutting assembly is aligned to form plural, linearly aligned, cut end portions in the ply strips.

25. The apparatus of claim 24 wherein the second displacement mechanism is configured to linearly displace said cutting assemblies in a timed sequence into contact with and to sever, in the timed sequence, their respective ply strips with which each cutting assembly is aligned to form the plural, linearly aligned, cut, end portions in said ply strips with all of the cut end portions being linearly aligned at the common predetermined angle with no triangular patterns or crenelations, wherein the common predetermined angle is non-perpendicular to longitudinal axes of the parallel, spaced ply strips.

* * * * *